H. A. MOYER.
BULL STAFF.
APPLICATION FILED JUNE 29, 1914.
1,202,879.
Patented Oct. 31, 1916.
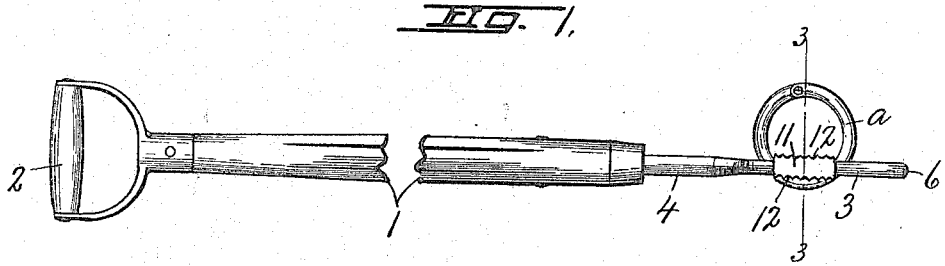
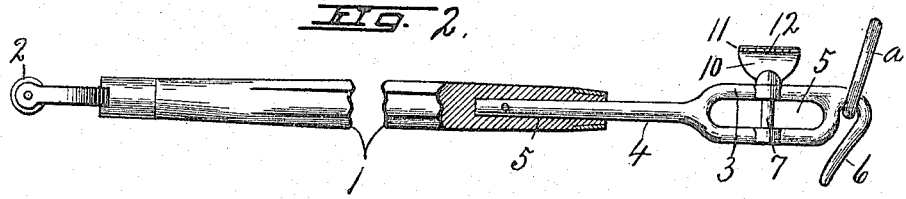
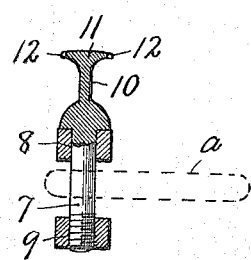
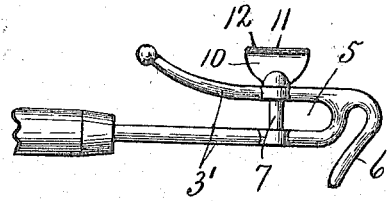
WITNESSES:
INVENTOR
H. A. Moyer
BY
ATTORNEY.

UNITED STATES PATENT OFFICE.

HARVEY A. MOYER, OF SYRACUSE, NEW YORK.

BULL-STAFF.

1,202,879.  Specification of Letters Patent.  Patented Oct. 31, 1916.

Application filed June 29, 1914. Serial No. 847,923.

*To all whom it may concern:*

Be it known that I, HARVEY A. MOYER, of Syracuse, in the county of Onondaga, in the State of New York, have invented new and useful Improvements in Bull-Staves, of which the following, taken in connection with the accompanying drawings, in a full, clear, and exact description.

This invention relates to certain improvements in bull staves for leading and controlling vicious and fractious animals through the medium of a ring engaged with or passed through the web or membrane of the nose.

The main object is to provide the staff with means whereby it may be engaged with the nose ring at a safe distance to lead or subdue the animal for leading from one place to another.

Another object is to provide the staff with a biting member having its biting edge or edges so arranged as to engage the crest of the nose or lip of the animal by a slight turn of the staff when engaged with the nose ring to assure the tractability of the animal under the most aggravating circumstances.

Other objects and uses relating to specific parts of the device will be brought out in the following description.

In the drawings Figures 1 and 2 are respectively a top plan and a side elevation, partly in section, of a bull staff embodying the features of my invention, the central portions of the handle being broken away, the nose ring being shown in the loop in Fig. 1 and engaged by the hook in Fig. 2. Fig. 3 is a vertical sectional view through the loop and fastening pin for the nose ring taken on line 3—3, Fig. 1. Fig. 4 is a side view of the ring-engaging end of the staff showing the loop as open at one end instead of closed at both ends as shown in Figs. 1 and 2.

This staff comprises a rod or main body —1— of wood or any other suitable light material of the desired length having one end provided with a handle —2— and its other end provided with a loop —3— having a shank —4— rigidly secured in a socket —5'— in the adjacent end of the main body —1— co-axial therewith.

The loop —3— is preferably elongated in the direction of the length of the staff and closed at both ends to form a slot —5—, said loop terminating in a hook-shaped extremity —6— disposed in the plane of the loop and having its point extending some distance to one side thereof to facilitate its engagement with a ring, as —a—, which has been previously fastened to the web or membrane of the animal's nose and, at the same time permitting the projecting end of the hook to be brought against some portion of the mouth of the animal by slight turning of the staff to increase the pull upon the ring in case the animal should resist being led by the hook.

In addition to the hook —6—, the loop —3— is provided with an additional ring-engaging member consisting of a pin or bolt —7— which is passed through registering apertures —8— and —9— in opposite sides of the loop, one of said apertures being threaded for receiving the correspondingly threaded end of the pin or bolt and holding it in operative position. The opposite end or head of the bolt rests against the adjacent side of the loop and is provided with a substantially flat web —10— and laterally projecting flanges —11— disposed in a plane transversely of or at substantially right angles to that of the loop and provided with serrated biting edges —12—, some distance to one side of the axis of the pin either of which is adapted to be brought into engagement with the crest of the animal's nose by a slight turn of the staff about its axis when the pin —7— is engaged with the ring —a— in the nose of the animal.

The biting edges —12— are preferably serrated for the purpose of subduing a vicious animal more easily and quickly, the disposition of these biting edges on opposite edges of the plate permitting either side to be brought into engagement with the crest of the nose according to the position of the operator relatively to the animal, that is whether on the right or left side. For example: when the attendant is on one side, one of the edges may be brought into engagement with the crest of the nose and, when on the opposite side, the other biting edge may be brought into action to render the animal more tractable when necessary.

In Fig. 4, I have shown a loop —3'— as open at its rear end which permits the inner side of the loop to be used as a hook to engage the nose ring —a— if desired either when the pin —7— is in place or removed.

In operation, when it is desired to lead an animal from one place to the other, the attendant may approach within the length of the staff and engage the hook —6— into the nose ring —a— and may then approach the head of the animal along the staff, keeping the latter well in hand to use in case of emergency, whereupon the bolt —7— may be quickly unscrewed by means of the head which then forms a hand piece after which the hook —6— may be quickly detached from the ring and the latter slipped into the slot —5—, the pin or bolt —7— being then replaced through the ring and screwed down tightly or until the web —10— lies parallel with the plane of the loop, thereby bringing the biting edges —12— at substantially right angles to such plane and in close proximity to the crest of the animal's nose ready to bring it to action at any time if necessary by slight turning of the staff through the medium of the handle —2—.

What I claim is:

1. A bull staff having a loop at one end, a pin extending across the loop and supported thereby for holding a nose ring in the loop and having its head provided with a flange projecting laterally of the plane of the loop and having a serrated edge projecting some distance to one side of the axis of the pin.

2. A bull staff having a loop at one end, a pin across the loop, and a biting member on the pin having oppositely projecting serrated edges in a plane transverse to that of the loop.

3. A bull staff having a loop at one end terminating in a hook, a pin across the loop, and a biting member on the pin in a plane transverse to that of the loop having oppositely projecting serrated edges projecting at some distance from opposite sides of the axis of the pin.

4. A bull staff having a loop at one end terminating in a hook, a pin across the loop, and a biting member on the pin having oppositely projecting serrated edges in a plane transverse to that of the loop.

In witness whereof I have hereunto set my hand this 23d day of June, 1914.

HARVEY A. MOYER.

Witnesses:
H. E. CHASE.
VIOLA HOWLAND.

Copies of this patent may be obtained for five cents each, by addressing the "Commissioner of Patents, Washington, D. C."